United States Patent [19]
Puzey

[11] Patent Number: 5,566,015
[45] Date of Patent: Oct. 15, 1996

[54] OPTICAL DEMULTIPLEXER WITH HIGH SPEED SUPERCONDUCTING SWITCH

[75] Inventor: Kenneth A. Puzey, Essex Junction, Vt.

[73] Assignee: International Business Machines Corporation, Armonk, N.Y.

[21] Appl. No.: 208,468

[22] Filed: Mar. 9, 1994

[51] Int. Cl.$^6$ .................. H04J 14/08; H04J 14/02
[52] U.S. Cl. ............... 359/139; 359/128; 359/131; 359/154; 505/182; 505/183
[58] Field of Search .................. 359/131, 128, 359/154, 139; 505/170, 181, 182, 183

[56] References Cited

U.S. PATENT DOCUMENTS

| | | | |
|---|---|---|---|
| 3,575,602 | 4/1971 | Townes et al. | 359/127 |
| 3,956,727 | 5/1976 | Wolf | 505/862 |
| 4,428,017 | 1/1984 | Vaerewyck et al. | 359/173 |
| 4,571,024 | 2/1986 | Husbands | 359/115 |
| 4,701,012 | 10/1987 | Kaiser | 359/159 |
| 4,933,928 | 6/1990 | Grant et al. | 359/128 |
| 5,036,042 | 7/1991 | Hed | 505/1 |
| 5,110,792 | 5/1992 | Nakayama et al. | 505/1 |
| 5,210,637 | 5/1993 | Puzey | 372/108 |
| 5,353,114 | 10/1994 | Hansen | 356/345 |

*Primary Examiner*—Leo Boudreau
*Assistant Examiner*—Bhavesh Mehta
*Attorney, Agent, or Firm*—Varnum, Riddering, Schmidt & Howlett LLP; Lynn L. Augspurger

[57] ABSTRACT

An optical data transmission system includes an optical data receiver having a plurality of optical detectors and an optical switch which directs successive pulses of a serial data stream to different detectors. The switch includes one or more superconductive mirrors responsive to current pulses to change from a superconducting, reflective state to a non-superconducting, non-reflective state for the duration of a current pulse. In this manner, high speed optical data is received by detectors incapable of operating at the high speed of available optical data links and transmitters. The mirror is oriented at an angle to the data stream such that an optical pulse is reflected to one detector when the mirror is in the superconducting, reflective state and is passed through the mirror to another detector when the mirror is temporarily in the non-superconducting, non-reflective state under the control of a current pulse. A plurality of mirrors may be used to direct optical pulses of the incoming data stream to more than two detectors.

10 Claims, 4 Drawing Sheets

OPTICAL DEMULTIPLEXER WITH HIGH SPEED SUPERCONDUCTING SWITCH

FIELD OF THE INVENTION

This invention relates to optical communication systems and particularly to optical receivers for the detection of data bits in optical data streams.

BACKGROUND OF THE INVENTION

Optical data communication systems have become the preferred medium for the transmission of information in the form of high speed data. In typical optical transmission systems, electrical signals representing binary data are converted into optical signals. The optical signals are transmitted via optical transmission links to an optical receiver and converted back to electrical signals. An optical transmitter typically includes a light source such as a light emitting diode or a laser and generates a modulated optical output signal varying between high and low light output, representing the logical 1's and 0's of a digital data stream. An optical receiver, commonly referred to as a detector, typically includes a light sensitive device which generates electrical output signals in response to optical input signals.

The primary advantage of optical transmission is the high data rates, e.g. in the giga bit (billion bits) per second range, which can be achieved in optical transmission medium, such as fiber optic systems. Significant improvements have been made in recent years in high speed optical data transmitting devices in order to take advantage of the capability of the optical transmission medium. One such high speed data transmission transmitting device is described in U.S. Pat. No. 5,210,637, issued May 11, 1993. This device uses a layer of superconductive material to modulate the light output of a standard light source such as a light emitting diode or a laser. It is a property of the superconductive material layer that it reflects light rays when it's in the superconducting state and that it is transparent to light rays in a non-superconducting state. The superconductive layer is switched between the superconducting and non-superconducting states by a modulation circuit operating at a high frequency. The superconductive material can be switched between the "on" and "off" states much faster than the conventional light source. Thus, higher data rates are achieved.

There seems to be an ever growing need in communications systems for higher information transfer rates. Currently, the information transfer rates are limited not by the transmission medium or the transmitters but by the receivers, which are not capable of operating at the same rate as the optical transmitters and optical transmission medium. Typically, in optical transmission systems, an additional system is added to handle the necessary traffic when the optical receiver of the existing system has reached its capacity. For example, in a system having a transmitter and a transmission medium capable of transmitting at the rate of 2 gigabits per second and a detector capable of receiving it at the rate of 1 gigabit per second, the capacity of the transmission system is limited to the capability of the detector. Thus, if a customer's needs require a transmission rate greater than 1 gigabits per second, a second transmission system, including a transmitter, a transmission medium and a detector will have to be supplied at substantial extra cost.

SUMMARY OF THE INVENTION

These and other problems of the prior art are solved in accordance with the present invention by means of an optical demultiplexer incorporating a high speed optical switch interposed between a plurality of standard optical receivers and an optical transmission link. The optical switch in accordance with this invention, comprises a layer of superconductive material responsive to electrical pulses to switch between a superconducting, reflective state and non-superconducting, non-reflective state. An optical signal received from an optical transmission link is reflected to a first detector when the mirror is in the superconducting, reflective state and is passed through the layer of superconductive material to a second detector when the mirror is in the non-superconducting, non-reflective state. A control circuit provides the electrical pulses to the superconductive material at a rate derived from the data rate of data pulses received from the transmission link. In this manner, the superconductive material is selectively controlled to direct the first of a plurality of incoming pulses to a first detector and a subsequent pulse or pulses to one or more other detectors.

In one specific embodiment of the invention, one layer of superconductive material interposed between an optical transmission link is used to alternately direct the pulses of an incoming optical data stream to two separate detectors. Advantageously, data transmitted at twice the data reception rate of the receivers can be accommodated in this arrangement.

In another embodiment of the invention, an optical demultiplexer comprises several separate superconductive layers disposed at predetermined angles to each other, directing optical data pulses to four separate detectors. The control circuitry is arranged as such that a control pulse is provided to each one of the four layers of superconductive material, in sequence. In this arrangement, a first optical data pulse from the optical link may be directed to a first detector and second, third and fourth optical data pulses from the optical data link may be directed to the second, third and fourth detectors, respectively.

Advantageously, in an arrangement in accordance with the invention, a receiving system can accommodate data rates many times greater than the data rate capability of the individual receivers. This is particularly advantageous in that lower speed receivers typically are less expensive and more sensitive than available higher data rate receivers. The use of detectors with increased sensitivity has a further advantage in that they are less sensitive to signal degradation. Therefore, longer transmission lines, with fewer repeater elements, can be used thereby significantly reducing the cost of the optical transmission system.

BRIEF DESCRIPTION OF THE DRAWING

An embodiment of the invention is described in the following paragraph with reference to the drawing in which.

DETAILED DESCRIPTION OF THE INVENTION

Figure 1:
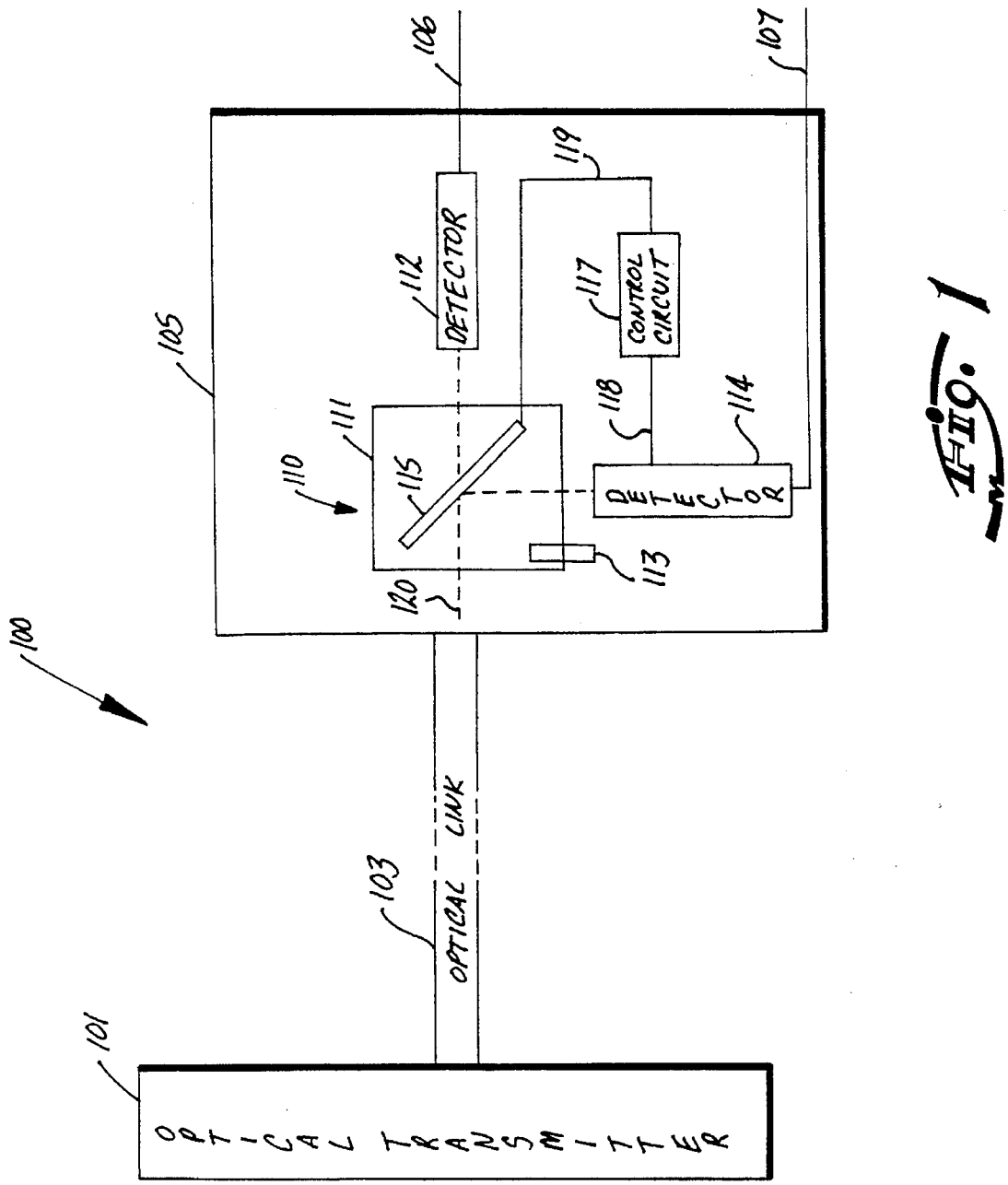
FIG. 1 is a schematic representation of an optical transmission system incorporating the principals of the invention.

FIG. 1 is a schematic representation of an optical data transmission system 100 including an optical transmitter 101, an optical transmission link 103, and an optical receiver 105. The optical receiver 105 comprises an optical demultiplexer switch 110 and a pair of optical detectors 112, 114. The optical switch 110 includes a mirror 115 controlled by current pulses from the control circuit 117 such that the bits of a serial data stream received from the optical link 103 are ultimately passed through to the detector 112 or reflected to the detector 114.

The mirror 115 comprises a wafer consisting of a thin superconductive material layer. As described in U.S. Pat. No. 5,210,637, issued May 11, 1993, and incorporated by reference herein, it is a natural property of superconductive materials that they change between superconducting and non-superconducting states when influenced by the affects of temperature, electric current or magnetic fields. It is also a natural property of superconductive materials that the reflectivity and transmittance of a thin superconductive material layer varies between the superconducting and non-superconducting states.

When a current pulse above a critical current level is applied to the mirror 115 by the control circuit 117, the mirror changes from its superconducting state in which it is highly reflective to a non-superconducting state with very low reflectivity. When the current pulse was terminated, the mirror will again return to its superconducting state and again become reflective. The mirror 115 is placed at an angle relative to the incoming light beam 120 to reflect the beam to the detector 114 when in the superconducting state, and to pass the light beam to the detector 112 when in the non-superconducting state. The detector 114, which receives the light beam when the mirror 115 is in the superconducting state, is positioned at approximately a 90 degree angle to the optical data stream 120. The mirror 115 is positioned at approximately 45 degrees to the data stream to reflect the light to the detector 114. It will be apparent that other angles of the mirror and corresponding positions of detector 114 may also be used. The mirror 115 is housed inside a Dewar type container 111 provided with optically transparent wall areas to allow the passage of the optical data stream. A standard cooling device 113 extends through a wall of the container to maintain the mirror 115 below the critical temperature for superconductivity. A Stirling cycle refrigerator such as the Hughes 7014H-2 Stirling cycle cooler available from Hughes Aircraft Co. may be used for these purposes. By way of example, the mirror may comprise a wafer of a superconductive material, such as $YBa_2Cu_3O_7$, having a thickness in the range of 0.1 microns to 1 micron. The wafer will preferably have a surface area larger than the cross section of the beam 120 and may be mounted in the container 111 by brackets or other suitable means.

The detectors 112 and 114 may be any of a number of commercially available optical detectors converting optical signals into electrical signals on output conductors 106 and 107, respectively. The optical data stream 120, transmitted by optical link 103, consists of a serial stream of pulses represented by the presence and absence of light, as depicted graphically in FIG. 4 at 401. The control circuit 117 receives a periodic electrical output signal from detector 114 on conductor 118. The control circuit 117 may be a standard phase locked loop (PLL) circuit responsive to the signal from detector 114 to generate a pulsed electrical signal in synchronism with the received data. The output pulses of control circuit 117 are generated at a rate which is one half of the bit rate of the incoming data stream 120, as depicted at 402 in FIG. 4. The magnitude of each of the pulses generated by the control circuit 117 is sufficient to drive the superconductive material into the non-superconducting state for the duration of the pulse. Thus, when output signals of the control circuit 117 are applied to the mirror 115, it will alternate between the superconducting, reflective state and the non-superconducting non-reflective state in synchronism with the bit rate of the incoming optical data stream 120. Consequently, the mirror 115 alternately reflects and passes the optical beam 120 in synchronism with the bit rate of the incoming optical data stream. In this manner, the data pulses represented by the incoming data stream received from the optical link 103 are directed to the detectors 112 and 114 on an alternating basis. The corresponding electrical output signals generated by these detectors on conductors 106 and 107 may be readily combined on a synchronized basis by well-known signal processing techniques.

Figure 2:
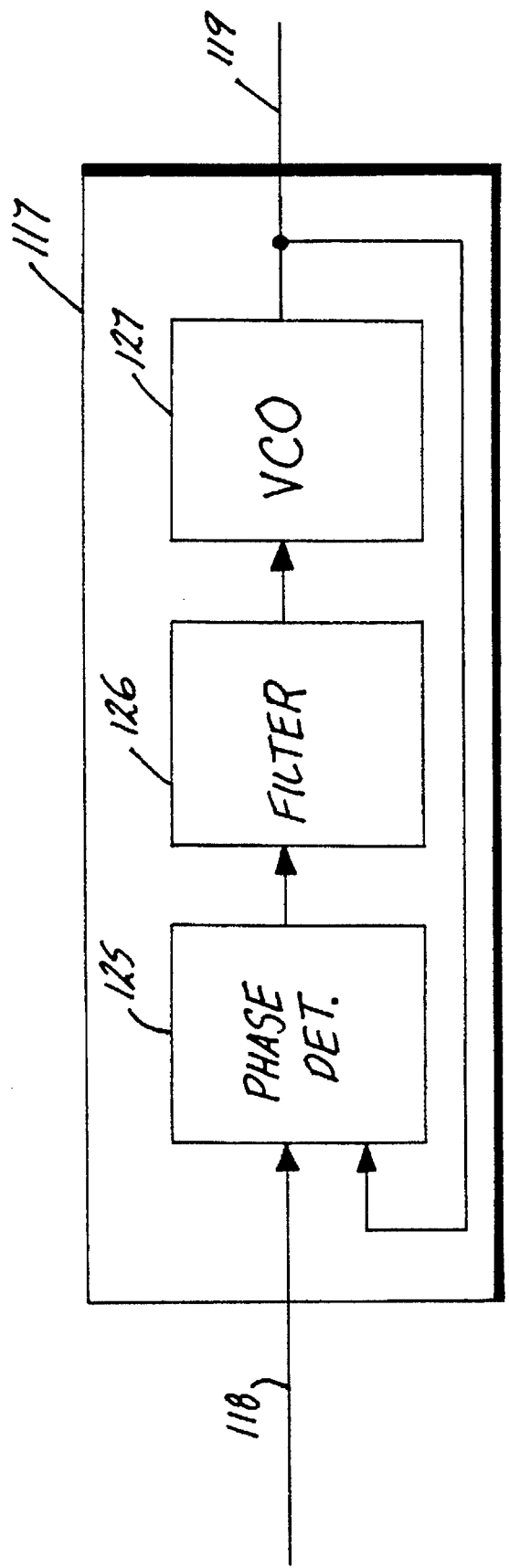
FIG. 2 is a diagrammatic representation of the control circuit of FIG. 1.
Figure 4:
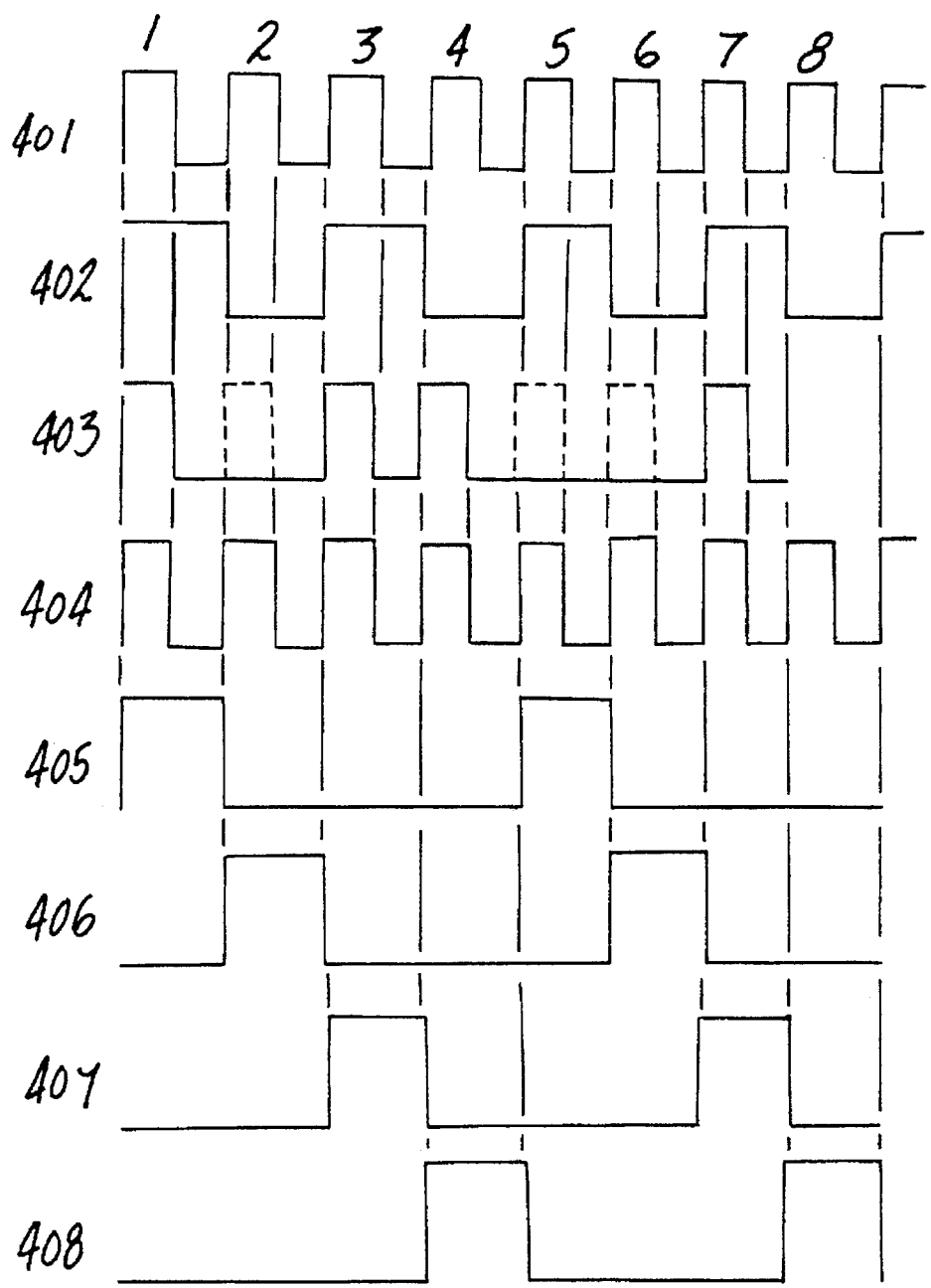
FIG. 4 is a timing diagram illustrating optical and electrical pulses occurring in the circuit arrangement depicted in FIGS. 1–3.

FIG. 2 is a block diagram representation of a standard, commercially available phase locked loop (PLL) circuit. Other known circuits such as a surface acoustic wave (SAW) filter or other clocked pulse arrangements may be used as well. The phase locked loop of FIG. 2 comprises a phase detector 125 which has input connections to the input conductor 118 and the output conductor 119 and which compares the phase of the input signal with the output signal. The phase detector 125 produces current pulses representative of the phase error between the input signal and the output signal. These error signals are transmitted via a filter 126 to a voltage controlled oscillator (VCO) 127 and controls the oscillator 127 to produce an output signal that is synchronized (i.e., phase locked) with the incoming data stream 120, in a well-known manner. As mentioned earlier, the incoming optical data stream 120 consists of a series of pulses represented by the presence and absence of light. FIG. 4 at line 401 illustrates a continuous series of pulses of logical ones. Line 403 of FIG. 4 represents an illustrative sequence of ones and zeroes and representing the sequence 1-0-11-00-1. The pulses of line 401 are labelled 1 through 8 and in the receiver 105, shown in FIG. 1, the odd number pulses will be directed to one of the detectors 112, 114 and the even numbered pulses that will be directed to the other of the detectors.

When the data transmission system is first activated, a special signalling sequence may be necessary to initialize the receiver 105. Transmitting a signal at half the speed of the normal high speed signal for a period of time will allow the control circuit 117 to be synchronized to the incoming data stream. The output 119 should be disabled from the mirror 115 until the control circuit 117 is stabilized and synchronized with the incoming data pulses. This can be done by ANDing the output signal on control link 119 with an enable line connected to the detector 114 and provided with a fixed delay such that the enable line inhibits the output of control circuit from reaching the mirror 115 until a predefined period of time after the first pulse has been received from the optical link 103. The duration of the fixed delay is a function of the characteristics of the control circuit 117 and can be readily determined. A typical delay may be on the order of 5 nanoseconds. If desired, an "idle" sequence may be transmitted on the optical link 103 during periods in which no meaningful data is being transmitted, to assure that the control circuit 117 continues to run in synchronism with the data rata of the optical link. In this manner, the need to re-initialize the control circuit 117 when data transmission has resumed is avoided. Such "idle" sequence may use a coding scheme which guarantees that a bit transition occurs frequently enough to keep the phase locked loop of the control circuit 117 synchronized. Such codes are known and described in the technical literature.

Figure 3:
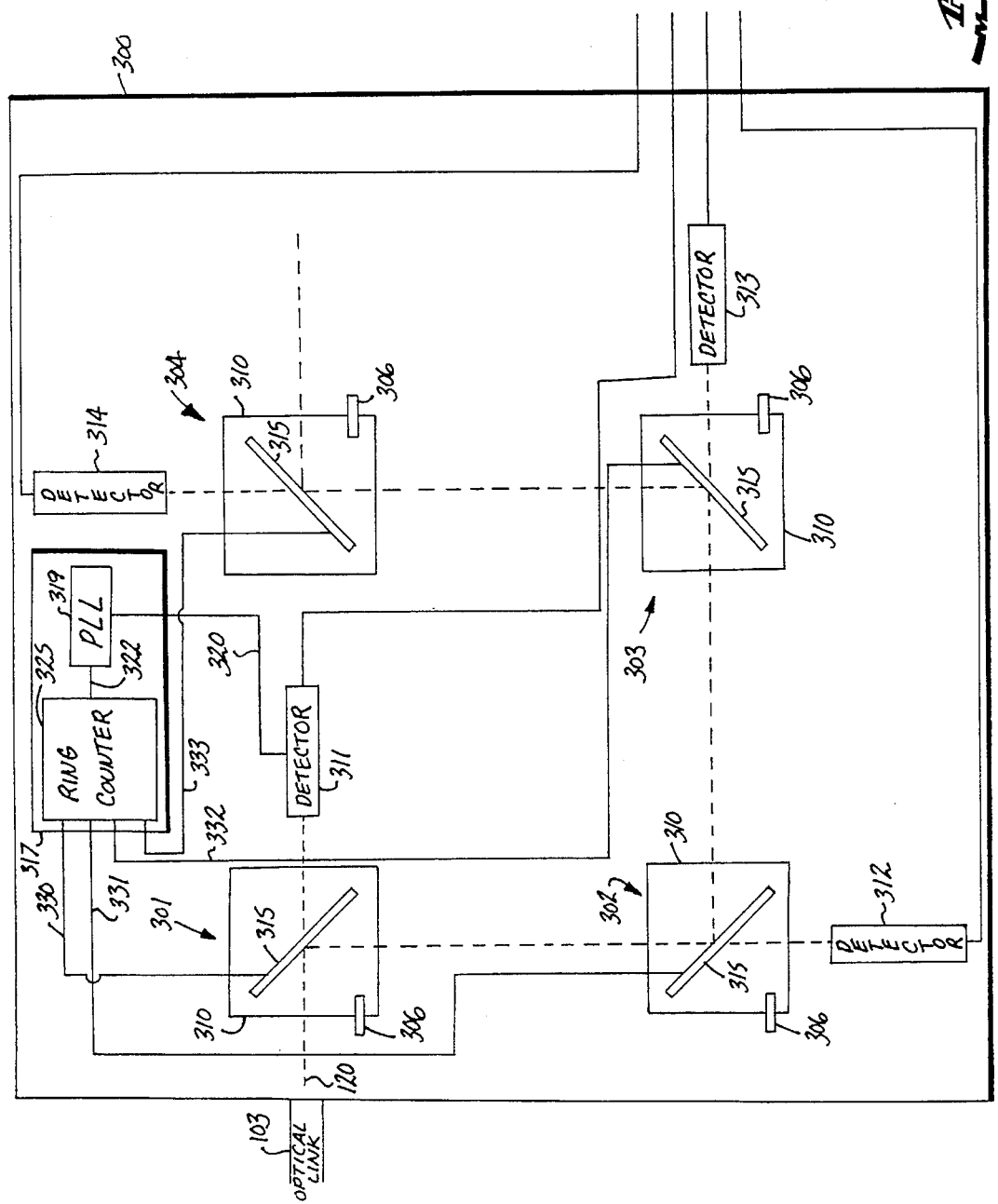
FIG. 3 is an alternate embodiment of the invention showing a use of a plurality of optical switches.

FIG. 3 depicts an alternate embodiment of the invention, showing an optical demultiplexer comprising four separate optical switches 301 through 304, each controlled in a predetermined sequence to change to the non-superconducting state to pass an optical signal to an associated one of the detectors 311 through 314, respectively. Each of the switches 301 through 304 comprises a mirror 315, like the mirror 115 described with respect to FIG. 1, consisting of a wafer of superconductive material. Each of the mirrors 315 is housed within a Dewar type container 310 provided with a cooling unit 306, such as the Stirling unit 113 described with respect to FIG. 1, to maintain the mirrors 315 below the critical temperature for superconduction.

A control circuit 317, consisting of a phase locked loop (PLL) 319 and a ring counter 325, applies current pulses to each of the mirrors in sequence. The PLL 319 may be identical to the control circuit 117 described with respect to FIG. 1, as shown in FIG. 2. The PLL 319 in the control circuit 317 receives a synchronizing signal from the detector 311 on input conductor 320 and produces a serial stream of output pulses in synchronism with the signal received from detector 311. FIG. 4, at 404, depicts the output of the PLL 319. This PLL 319 provides an output pulse for synchronism with the input pulses received from the optical link 103, depicted at 401 in FIG. 4. The synchronized control pulses from PLL 319 are transmitted via conductor 322 to a four-stage ring counter 325, which is a well-known and commercially available device. The ring counter is responsive to each pulse from the PLL 319 to generate a control pulse on each of its output conductors 330 through 333, in sequence and in synchronism with the incoming data stream. The output pulses generated by the control circuit 317 on control conductors 330 through 333 are depicted in FIG. 4 at 405 through 408, respectively.

As stated earlier with reference to FIG. 1, the mirrors 315 are responsive to current pulses to temporarily change from the superconducting, highly reflective state to the non-superconducting, non-reflective state. As will be apparent with reference to FIGS. 3 and 4, a current pulse is applied to each of the mirrors 315 of the switches 301 through 304 in sequence and in synchronism with the incoming data stream, causing each of the mirrors to assume the non-reflective state for a period of time corresponding to the duration of the pulse. Accordingly, an optical signal is transmitted to the one of the detectors, 311 through 314, associated with the one of the switches, 301 through 304, receiving the current pulse. By way of example, a current pulse is applied to switch 301 in a first time slot causing the mirror 315 of switch 301 to assume the non-superconducting, non-reflective state. An optical signal of the data stream 120 is therefore passed to the detector 311. In the next time slot, a similar pulse is applied to switch 302 only. Thus, the mirror 315 of switch 301 will be in the superconducting, highly reflective state. Consequently, the optical data stream is reflected by switch 301 to switch 302 where the mirror 315 will be in the non-superconducting, non-reflective state and the optical signal will be passed through to the detector 312. Similarly, in a third time slot, the pulse will be applied to the switch 303 only. Consequently, the optical data stream will be reflected by switch 301 and switch 302 to switch 303. The mirror 315 of switch 303 will be in the non-superconducting, non-reflective state passing the optical signal to the detector 313. In a next time slot, the current pulse is applied to switch 304 only. The incoming optical data stream is reflected by switches 301, 302, and 303 since none of these switches receive the current pulse and consequently are in the superconducting, reflective state. The current pulse applied to switch 304 causes its mirror 315 to assume the non-superconducting, non-reflective state causing the signal to be passed to the detector 314. It will be apparent that if no signal is applied to any of the switches 301 through 304, the optical signal may be reflected from switch 304 to a further optical switch or to another detector. In this manner, the optical signal 120 received from the optical link 103 is demultiplexed and distributed among a plurality of detectors. Since each of the optical switches (e.g., 301, 302) selectively directs an incoming optical data stream in two directions, the number of switches required to demultiplex the optical signal to several detectors is one fewer than the number of detectors. For example, in the arrangement of FIG. 3 the switch 304 is superfluous if the optical signal is to be demultiplexed to four detectors since the detector 314 may be placed adjacent switch 303 to detect the optical data stream when the three switches 301, 302, 303 are in the superconducting, reflective state. The mirrors 315 in each case are preferably arranged at a 45 degree angle to the optical data stream. However, any suitable angle between zero and 90 degrees may be used.

What is claimed is:

1. An optical data transmission system comprising:

a data transmitter generating a binary encoded optical data stream comprising a serial stream of discrete data pulses of predefined duration represented by the presence and absence of light;

an optical data receiver;

an optical data link transmitting the optical data stream from the transmitter to the receiver;

the optical data receiver aligned with the optical data stream and comprising first and second optical detectors and an optical switch;

pulses of the serial stream of pulses being transmitted to the receiver at a predefined data rate and the optical switch comprising a wafer of superconductive material disposed in alignment with the optical data stream and at a predefined angle to the data stream; and a control circuit connected to the wafer and generating periodic output pulses;

the wafer responsive to the periodic output pulses to change between a superconducting state in which light incident on the wafer is reflected and a non-superconducting state in which light incident on the wafer is passed through the wafer to alternately direct successive pulses of the serial data stream to the first and second optical detectors.

2. The system in accordance with claim 1 wherein the detectors are responsive to the pulses of the optical data stream to generate corresponding electrical output pulses and the control circuit is connected to one of the detectors and responsive to the electrical output pulses of the one of the detectors to generate the periodic pulses in synchronism with the data rate of the optical data stream, whereby the optical data stream is alternately directed to the first and second optical detectors in synchronism with the optical data stream.

3. The system in accordance with claim 2 wherein one of the detectors is disposed in substantially linear alignment with the optical data stream and the other of the detectors is disposed at an angle to the optical data stream substantially equal to 180 degrees minus two times the predefined angle.

4. The system in accordance with claim 3 wherein the control circuit comprises a phase locked loop circuit.

5. The system in accordance with claim 1 wherein the predefined angle is greater than zero and less than 90 degrees.

6. An optical data transmission system comprising:

a data transmitter generating a binary encoded optical data stream comprising a serial stream of pulses represented by the presence and absence of light;

an optical data receiver;

an optical data link transmitting the optical data stream from the transmitter to the receiver;

the optical data receiver comprising a plurality of optical detectors and optical switch arrangement operative to direct successive pulses of the serial data stream to the individual ones of the detectors in sequence;

the pulses of the serial stream of pulses being transmitted to the receiver at a predefined data rate;

the optical switch arrangement comprising a plurality of separate switches, each comprising a wafer of superconductive material, a first one of the switches disposed in alignment with the optical data stream and at a predefined angle to the data stream a control circuit connected to each of the wafers and generating periodic output pulses each of the wafers responsive to the periodic output pulses to change between a superconducting state in which light incident on the wafer is reflected and a non-superconducting state in which light incident on the wafer is passed through the wafer; and a second of the switches disposed in alignment with light reflected by the first one of the switches.

7. The system in accordance with claim 6 wherein the detectors are responsive to the pulses of the optical data stream to generate corresponding electrical output pulses and the control circuit is connected to one of the detectors and responsive to the electrical output pulses of the one of the detectors to generate the periodic pulses in synchronism with the data rate of the optical data stream, whereby the optical data stream is directed to the individual ones of the optical detectors in sequence, in synchronism with the bit rate of the optical data stream.

8. The system in accordance with claim 7 wherein at least one detector is associated with each of the switches and wherein the control circuit comprises a counter circuit and is responsive to a periodic pulse from the one of the detectors to generate a plurality of control pulses in a timed sequence and wherein each of the mirrors is controlled by the control pulses to temporarily change to the non-superconducting state, in a predefined sequence, and to pass a pulse of the serial stream of pulses to an associated detector.

9. The system in accordance with claim 6 wherein a third one of the detectors is disposed in substantially linear alignment with light reflected by a second one of the switches.

10. The system in accordance with claim 9 wherein each of the wafers is contained within a cooling container and each of the wafers is maintained at a sufficiently low temperature to keep the wafer in the superconducting state in the absence of an electrical pulse from the control circuit.

* * * * *